United States Patent

[11] 3,623,989

[72] Inventors Helmut Mayr;
Richard Pelte, both of Munich, Germany
[21] Appl. No. 16,308
[22] Filed Mar. 4, 1970
[45] Patented Nov. 30, 1971
[73] Assignee Agfa-Gevaert Aktiengesellschaft
Leverkusen, Germany
[32] Priority Mar. 7, 1969
[33] Germany
[31] P 19 11 772.7

[54] FADE-IN AND FADEOUT ARRANGEMENT FOR MOTION PICTURE CAMERAS
11 Claims, 2 Drawing Figs.

[52] U.S. Cl. .................................................. 352/91, 352/141
[51] Int. Cl. .................................................. G03b 21/36

[50] Field of Search .......................................... 95/10, 64; 352/91, 141

[56] References Cited
UNITED STATES PATENTS
3,419,325  12/1968  Mayr et al. .................... 352/141 X Primary Examiner—Donald O. Woodiel
Attorney—Michael S. Striker ABSTRACT: Fade-in and fadeout is accomplished by varying the current through a moving coil instrument which controls the diaphragm opening. The timing circuit which controls the fade-in and fadeout has a capacitor connected from the collector to the base of the transistor which causes the changes in current. Since the transistor has a load resistance, changes in potential at the collector are transmitted to the base, thereby increasing the time constant of the timing circuit.

PATENTED NOV 30 1971 3,623,989

INVENTOR.
HELMUT MAYR
RICHARD PELTE

BY

Michael S. Huber
Attorney

FADE-IN AND FADEOUT ARRANGEMENT FOR MOTION PICTURE CAMERAS

BACKGROUND OF THE INVENTION

This invention relates to fade-in and fadeout arrangements for motion picture cameras. In particular, it relates to such fade-in and fadeout arrangements which operate in conjunction with an exposure control circuit which has a photoresistance controlling the opening of the shutter as a function of light reflected from the object to be photographed. Such a circuit is disclosed in U.S. Pat. No. 3,419,325. This invention constitutes an improvement on the circuit disclosed in said patent.

The circuit disclosed in U.S. Pat. No. 3,419,325 comprises a transistor having an emitter-collector circuit connected in parallel with a photoresistance. The current through the photoresistance, as well as the emitter-collector current, together form the current through the electromechanical instrument determining the diaphragm opening. A timing capacitor is connected to the base of the transistor. In particular, this timing capacitor is part of the base-emitter circuit. No load resistance appears in the collector circuit.

SUMMARY OF THE INVENTION

This invention is a fade-in and fadeout arrangement for motion-picture cameras. In this arrangement, an exposure control circuit has a diaphragm and current-controlled diaphragm control means for operating said diaphragm, namely opening and closing it. Further, photoresistor means are positioned to receive light reflected from the object to be photographed. The photoresistor means are connected to said diaphragm current-controlled means for varying the current therethrough.

Amplifier means also form a part of this arrangement. These amplifier means comprise an output circuit having a first and second output terminal. The output circuit is connected in parallel with said photoresistor means. The amplifier means further comprise a control element.

A voltage source having a first and second source terminal is also furnished, as are load resistance means connecting said first source terminal to the first output terminal of said amplifier means.

Finally, timing circuit means are provided which have a capacitor connected between the control element and the first output terminal, whereby changes in potential occurring at said output terminal are transmitted by means of said capacitor to said control element, thereby increasing the time constant of said timing circuit.

The above-described arrangement has the advantage that the time constant of the circuit for a given value of capacitance, is larger than it would be for the circuit disclosed in the U.S. Pat. No. 3,419,325. Alternatively, for a desired time constant, a smaller value of capacitance would be required.

This change in time constant results from the fact that the voltage at one capacitor terminal changes because of current flow through the load resistance. This change in potential is transmitted to the control element, for example the base of a transistor, and causes the potential at the base to change accordingly. Thus, a potential change at the base is superimposed upon the charge and discharge voltages of the capacitor. These potential changes oppose the charging and discharge processes. It is this opposition which causes the increase in time constant relative to the known circuits.

In a further development of the present invention, additional resistance means are furnished. These may comprise a first and second resistor which may be connected, alternatively, in parallel to the base-collector circuit or the base-emitter circuit of the transistor, respectively.

Furthermore, in one embodiment of the present invention, the resistance of the electromechanical, or moving coil instrument, which is used to control the diaphragm opening, is also used as the load resistance connecting the collector of the transistor to the voltage source. This has the advantage that the moving coil instrument serves a double function. To prevent the discharge of a capacitor from taking place through the moving coil instrument, a diode is arranged between the moving coil instrument and the collector of the transistor.

In another embodiment of the present invention, the base of the transistor is connected to the voltage divider tap of a voltage divider connected in parallel with the voltage source. A simple two-pole switch, herein referred to as second switching means, may then be activated to connect a further resistance in parallel with part of the voltage divider means. In this case, a simple two-pole switch can be used to replace the selector switch which permitted adding a resistance in parallel alternatively to the base-emitter and the base-collector circuit of the transistor.

Use of such a voltage divider further has the advantage that it can be so proportioned that the voltage between the base and emitter of the transistor is just sufficient to block the transistor. Activation of the switch (second switching means) then causes the transmitter to be switched to the conducting stage without any delay. The value of the further resistance means connected into the circuit by the second switching means, must be so chosen that the transistor becomes sufficiently conductive to furnish enough current to the moving coil instrument to cause it to close the diaphragm.

For achieving the desired time constant, a resistance may be added in series to the timing capacitor.

Further changes in time constant can be effected by means of a second capacitor to be connected in parallel with the timing capacitor or, changes in the time constant may be made by letting some of the resistance means comprise variable resistors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
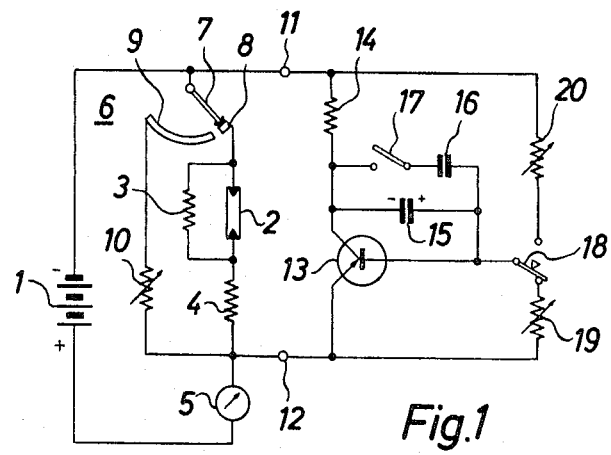
FIG. 1 shows a fade-in and fadeout arrangement having a load resistance in the collector circuit of a transistor, the timing capacitor being connected between the collector and the base of said transistor.

The preferred embodiment of the present invention will now be discussed with reference to the drawing.

FIG. 1 shows a DC voltage source denoted by numeral 1. Reference numeral 2 refers to a photoresistance, one embodiment of photosensitive means, which is exposed to the light reflected by the object to be photographed. Resistances 3 and 4 serve as balancing resistors in the light-measuring circuit. A moving coil instrument 5, one embodiment of current controlled means, deflects in dependence on the current flowing through the above-described measuring circuit. Thus its deflection depends substantially on the resistance of photoresistor 2. A diaphragm which is not shown is coupled to the moving coil instrument 5. The diaphragm is positioned in the path of the light entering the camera and thus controls the exposure of the film. Reference numeral 6 denotes the potentiometer which serves to allow manual adjustment of the diaphragm in a conventional way. The wiper arm 7 is connected via a segment 8 of the potentiometer to the photoresistance 2 and, via a second segment 9 to a variable resistance 10 whose other terminal is directly connected to the moving coil instrument 5. Amplifier means, here a transistor 13, have an output circuit, here the emitter-collector circuit connected in parallel to the photoresistor 2, at terminals 11 and 12. A load resistance 14 connects the collector, or first output terminal, to terminal 11, the first source terminal.

A capacitor 15 is connected between the collector and base of transistor 13. A second capacitor 16 may be connected via a switch 17, which constitutes third switching means. First switching means, namely a selector switch 18, connect the base of transistor 13 alternatively via a variable resistance 19, to the emitter of resistance 20 to the first source terminal.

The arrangement of FIG. 1 operates as follows:

When switch 18 is in the position shown, the transistor 13 is blocked, since the base is at the same potential as the emitter. Capacitor 15 is charged approximately to the battery voltage via resistors 14 and 19. The current flowing through the moving coil instrument 5 depends upon the value of the photoresistor 2 and the value of resistances 3 and 4.

When the switch is in the position shown, the diaphragm is open. Manual operation of switch 18 to switch it to its other position then starts a fadeout process. In this position of switch 18, the variable resistance 20 is connected in parallel to the series combination of resistance 14 and capacitor 15. The capacitor 15 thus starts to discharge via resistance 20 and load resistance 14. Discharge of capacitor 15 causes the base of 13 to become more negative. This causes transistor 13 to become conductive and to cause a slowly increasing current to flow in the emitter-collector circuit of the transistor. This, in turn, causes the collector of the transistor to be at an increasingly positive voltage. This change in potential at the collector of transistor 13, is transmitted to the base of the transistor via condenser 15. Thus the potential at the base of the transistor becomes more positive. This change in voltage at the base of transistor 13 opposes the change in base potential caused by the discharge of capacitor 15. After the capacitor 15 has discharged, the transistor 13 is fully conductive so that the current through the emitter-collector circuit of the transistor is determined by the resistance of load resistor 14, one embodiment of amplified load means.

The current flowing through the collector-emitter circuit of the transistor is then superimposed upon the current flowing through the photoresistor 2 and the total current flows through the moving coil instrument 5. This causes an increasing deflection of the moving coil instrument 5 and therewith an increasing fadeout movement. The fadeout time constant is thus proportional to the time constant of the circuit shown in FIG. 1 with switch 18 in the upper position.

If selector switch 18 is now returned to its original position, the capacitor 15 is recharged via resistance 14 and 19. Thus a fade-in process starts, whose time constant is proportional to the time constant of the circuit of FIG. 1. The time constant may be modified by closing third switching means, here a switch 17, which connects a second capacitor in parallel to capacitor 15. This causes a corresponding increase in the time constant. Switch 17 may be coupled to some part of the film transport means, to cause its operation to coincide with changes in the speed of the film transport.

Figure 2:
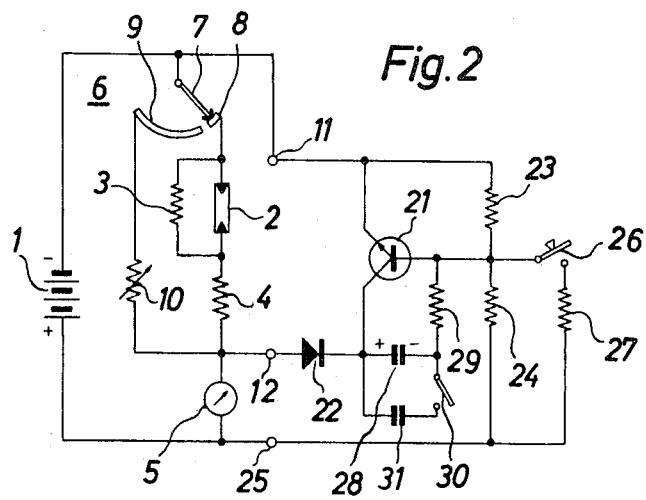
FIG. 2 shows an alternate embodiment of the present invention in which the resistance of the moving coil instrument constitutes the load resistance for the transistor.

In FIG. 2, elements having the same reference numbers as in FIG. 1, namely, elements 1 through 10, correspond to the same numbered elements as in FIG. 1. The difference in the circuit of FIG. 2, relative to FIG. 1, is that in the circuit of FIG. 2, the load resistance is furnished by the resistance of the moving coil instrument 5. The moving coil instrument 5 thus furnishes the load resistance amplifier load means for a transistor 21 which has an emitter-collector circuit connected in parallel to photoresistance 2. In this case, a NPN transistor is used. The emitter of transistor 21 is connected to the negative terminal of the battery 1 (voltage source) via terminal 11, while the collector is connected to the moving coil instrument as load via a diode 22 having a cathode connected to terminal 12. The base of transistor 21 is connected to voltage divider means, here a voltage divider having a resistance 23 connected from terminal 11 to the base and a resistance 24 connected from the base to the second source terminal, namely the positive side of the battery 1. Further resistance means, namely a resistor 27, may be connected in parallel with resistance 24 by closing of the second switching means, switch 26. A series circuit comprising a capacitor 28 and a series resistor 29 is also connected between the collector and the base of transistor 21. The time constant of the circuit may be increased by inserting an additional capacitor 31 in parallel to capacitor 28 by closing a switch 30. The values of resistances 23 and 24 are so selected that the voltage between the base and the emitter of the transistor suffices to block said transistor. The value of resistance 27 is so selected that sufficient current for activating the moving coil instrument 5 flows through transistor 21 for closing the diaphragm.

The arrangement of FIG. 2 operates as follows:

When switch 26 is opened, capacitor 28 charges via the moving coil instrument 5, the diode 22, resistor 29, and resistance 23. In the quiescent state, the amount of current flowing through the moving coil instrument 5 is determined by the value of the resistance of photoresistor 2 and the value selected for resistors 3 and 4. Transistor 21 is blocked so that no current flows through its emitter-collector circuit. In this case the diaphragm circuit is opened.

Closing of switch 26, which may be done manually, causes resistance 27 to be connected in parallel to resistance 24. Capacitor 28 begins to discharge via the collector-emitter circuit of transistor 21 and resistor 29 and resistance 23. The base of transistor 21 becomes more positive. Diode 22 prevents the discharge of capacitor 28 through the moving coil instrument 5. As the potential at the base of transistor 21 becomes more positive, transistor 21 slowly begins to conduct current. Therefore an additional, steadily increasing current is superimposed upon the current originally flowing through the moving coil instrument 5. This additional current flows through the moving coil, through diode 22 and through the emitter-collector circuit of transistor 21. This increase in current through instrument 5 causes the diaphragm to close slowly. Furthermore, since the voltage drop across the instrument increases steadily, the voltage at the collector of transistor 21 decreases, that is, becomes slowly more negative. This change in potential at the collector is transmitted via capacitor 28 to the base of transistor 21, causing the rate of increase of current through the collector-emitter circuit of transistor 21 to be decreased. After the capacitor 28 has been fully discharged, the diaphragm is closed.

If switch 26 is now opened, capacitor 28 recharges over the moving coil instrument 5, diode 22, and resistors 29 and 23. After a time determined by the time constant of this circuit, transistor 21 is again blocked so that the diaphragm is now opened to a value corresponding to the prevailing light conditions. While transistor 21 is slowly being shifted towards the blocked condition, the current through the moving coil instrument decreases steadily and, after blocking of transistor 21, assumes a value determined by the resistance values of photoresistor 2 and resistors 3 and 4.

By connecting capacitor 31 in parallel with capacitor 28, a corresponding increase in time constant can be obtained. Switch 30, by means of which the additional capacitance is added, may, for example, be coupled to the film transport and thus be opened or closed in relation to the actual transport speed of the film.

The advantage of the arrangement shown in FIG. 2 lies in the fact that, in addition to allowing the use of capacitors of a smaller capacitance, the selector switch 18 of FIG. 1 has been replaced by a simply two-pole switch 26. A further advantage is that activation of switch 26 causes the fadeout to take place without any appreciable time delay.

The power consumption of the arrangement in accordance with this invention may be kept at a low value by using high resistance values for resistors 23 and 24.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. Fade-in and fadeout arrangement for motion-picture cameras, comprising, in combination, an exposure control circuit having photosensitive means positioned to receive light reflected from the object to be photographed and furnishing a first signal in response thereto, and light controlling means effecting exposure control in response to said first signal; amplifier means having a control element and an output circuit, including a first and second output terminal, connected in parallel with said photosensitive means; a voltage source having a first and second source terminal; amplifier load means connecting said first source terminal to said first output terminal; timing capacitor means connected between said control element and said first output terminal; additional resistance means; and first switching means connecting said additional resistance means to said timing capacitor means and said amplifier load means when in a first state, in such a manner that said timing capacitor means discharges through both said amplifier load means and said additional resistance means, and disconnecting said additional resistance means from said timing capacitor means and said amplifier load means when in a second state.

2. A fade-in and fadeout arrangement as set forth in claim 1, wherein said amplifier means comprises a transistor, said first and second output terminals respectively comprising the collector and emitter of said transistor, said control element comprising the base of said transistor; further comprising voltage divider means connected in parallel with said voltage source, and having a voltage divider tap connected to the base of said transistor.

3. A fade-in and fadeout arrangement as set forth in claim 2, wherein said transistor is blocked when said additional resistance means is disconnected by said first switching means, and wherein said transistor is conductive when said additional resistance means is connected to said voltage divider tap by said first switching means.

4. A fade-in and fadeout arrangement as set forth in claim 2, wherein said transistor is blocked when said further resistance means is disconnected by said second switching means, and wherein said transistor is conductive when said further resistance means is connected to said voltage divider tap by said second switching means.

5. A fade-in and fadeout arrangement as set forth in claim 1, further comprising a series resistor connected in series with said timing capacitor means between said control element and said first output terminal.

6. A fade-in and fadeout arrangement as set forth in claim 1, wherein said exposure control circuit comprises current-controlled means for operating said light controlling means in response to said first signal; and wherein said current-controlled means constitute said amplifier load means.

7. A fade-in and fadeout arrangement as set forth in claim 6, wherein said current-controlled means comprise a moving coil.

8. A fade-in and fadeout arrangement as set forth in claim 7, further comprising unidirectional conducting means connected between said first output terminal and said moving coil, in such a manner that said timing capacitor means cannot discharge through said moving coil.

9. A fade-in and fadeout arrangement as set forth in claim 1, further comprising a second capacitor; and second switching means for connecting said second capacitor in parallel with said timing capacitor means when in a conductive state.

10. A fade-in and fadeout arrangement as set forth in claim 9, wherein said second switching means is connected to the film transport means in such a manner that the operation of said third switching means depends upon the speed with which the film is advanced.

11. A fade-in and fadeout arrangement as set forth in claim 1, wherein said additional resistance means comprise first and second additional resistance means; and wherein said first switching means comprise selector switching means alternatively connecting said first additional resistance means in parallel with said amplifier load means and said timing capacitor means, or said second additional resistance means between said second output terminal and said control element of said amplifier means.

* * * * *